(12) United States Patent
Mukdaprakorn

(10) Patent No.: US 6,898,893 B1
(45) Date of Patent: May 31, 2005

(54) PORTABLE FISHING POLE HOLDER

(76) Inventor: Lisa Mukdaprakorn, 1004 W. Oak St., Burbank, CA (US) 91506

( * ) Notice: Subject to any disclaimer, the term of this patent is extended or adjusted under 35 U.S.C. 154(b) by 0 days.

(21) Appl. No.: 10/937,719

(22) Filed: Sep. 9, 2004

(51) Int. Cl.$^7$ ............................................. A01K 97/10
(52) U.S. Cl. ....................... 43/21.2; 248/518; 248/530; 248/535; 248/538
(58) Field of Search ......................... 43/21.2; 248/530, 248/533, 518, 511, 514, 534–536, 538–540

(56) References Cited

U.S. PATENT DOCUMENTS

| | | | |
|---|---|---|---|
| 417,997 A | * | 12/1889 | Dupuis ........................ 248/535 |
| 1,987,842 A | * | 1/1935 | Sampson ..................... 43/21.2 |
| 2,314,747 A | * | 3/1943 | White .......................... 43/21.2 |
| 2,518,908 A | * | 8/1950 | Korus .......................... 248/518 |
| 2,548,328 A | * | 4/1951 | Thayer ......................... 248/518 |
| 2,619,308 A | * | 11/1952 | Guestinger ................... 248/518 |
| 2,632,616 A | * | 3/1953 | Heistand ...................... 248/514 |
| 2,642,690 A | * | 6/1953 | Soenksen .................... 43/21.2 |
| 2,694,538 A | * | 11/1954 | Consolo et al. ............. 248/518 |
| 2,704,412 A | * | 3/1955 | Davis ........................... 43/21.2 |
| 2,835,066 A | * | 5/1958 | Spilker ......................... 43/21.2 |
| 2,902,237 A | * | 9/1959 | Carper ......................... 248/518 |
| 2,952,432 A | * | 9/1960 | Valdez ......................... 248/518 |
| 2,961,209 A | * | 11/1960 | Willey ......................... 248/540 |
| 2,985,414 A | * | 5/1961 | Edward ....................... 248/534 |
| 2,988,311 A | * | 6/1961 | Bow ............................ 248/514 |
| 3,074,197 A | * | 1/1963 | Schnars ....................... 43/21.2 |
| 3,341,157 A | * | 9/1967 | Duncan ....................... 43/21.2 |
| 3,385,544 A | * | 5/1968 | Barnett ........................ 43/21.2 |
| 3,568,963 A | * | 3/1971 | Koskinen .................... 248/534 |
| 3,612,454 A | * | 10/1971 | Linn ............................ 248/518 |
| 3,708,141 A | * | 1/1973 | Friedgen et al. ............. 248/540 |
| 3,783,547 A | * | 1/1974 | Bystrom et al. .............. 43/21.2 |
| 3,835,568 A | * | 9/1974 | Whitfield ..................... 43/21.2 |
| 3,862,508 A | * | 1/1975 | Morgan ....................... 43/21.2 |
| 3,903,633 A | * | 9/1975 | Hutcherson ................. 43/21.2 |
| 3,906,653 A | * | 9/1975 | Williams ..................... 43/21.2 |
| 3,992,798 A | * | 11/1976 | Schmitt, Sr. ................. 43/21.2 |
| 4,007,902 A | * | 2/1977 | Pettee .......................... 43/21.2 |
| 4,106,811 A | * | 8/1978 | Hernandez ................... 43/21.2 |
| 4,235,409 A | * | 11/1980 | Cummings .................. 248/538 |
| 4,407,089 A | * | 10/1983 | Miller .......................... 43/21.2 |

(Continued)

FOREIGN PATENT DOCUMENTS

CA      2176262 A1 * 11/1997

(Continued)

*Primary Examiner*—Darren W. Ark
(74) *Attorney, Agent, or Firm*—Goldstein Law Offices, P.C.

(57) ABSTRACT

A fishing rod holder system, for holding a fishing rod and securing to a deck rail or ground surface, using a fishing rod holder having a threaded rod, a fixed clamp attached to one end of the threaded rod, a u-shaped rod support bracket attached to the other end of the threaded rod, a movable clamp, and an adjustment wheel for holding the fixed clamp against the movable clamp. A rod support tube mounts in the u-shaped rod support bracket and has an open end for holding the fishing rod. A ground adapter has a cylindrical body that selectively inserts between the fixed clamp and movable clamp and has a pair of stakes for attaching to the ground surface. The holder may be secure to the deck rail by extending the deck rail between the fixed clamp and movable clamp and tightening the adjustment wheel thereagainst.

6 Claims, 4 Drawing Sheets

U.S. PATENT DOCUMENTS

| | | | | |
|---|---|---|---|---|
| 4,531,643 A * | 7/1985 | Bradley | ................ | 248/538 |
| 4,803,794 A * | 2/1989 | Lopez | ................ | 43/21.2 |
| 4,832,338 A * | 5/1989 | Magazzi | ................ | 248/530 |
| 4,852,291 A * | 8/1989 | Mengo | ................ | 43/21.2 |
| 5,009,027 A * | 4/1991 | Lee | ................ | 43/21.2 |
| 5,120,016 A * | 6/1992 | Dysarz | ................ | 43/21.2 |
| 5,142,809 A * | 9/1992 | O'Brien | ................ | 43/21.2 |
| 5,163,652 A * | 11/1992 | King | ................ | 43/21.2 |
| 5,210,971 A * | 5/1993 | Efantis | ................ | 43/21.2 |
| 5,365,689 A * | 11/1994 | Holliman | ................ | 43/21.2 |
| 5,367,815 A * | 11/1994 | Liou | ................ | 43/21.2 |
| 5,560,137 A * | 10/1996 | Herring | ................ | 420/21.2 |
| 5,566,495 A * | 10/1996 | Kim et al. | ................ | 43/21.2 |
| 5,625,974 A * | 5/1997 | Demaio | ................ | 43/21.2 |
| 5,632,112 A * | 5/1997 | Steinborn | ................ | 43/21.2 |
| 5,662,306 A * | 9/1997 | Dysarz | ................ | 43/21.2 |
| 5,813,163 A * | 9/1998 | Dysarz | ................ | 43/21.2 |
| 5,967,075 A * | 10/1999 | Johansen | ................ | 43/21.2 |
| 6,088,946 A * | 7/2000 | Simmons | ................ | 43/21.2 |
| 6,112,449 A * | 9/2000 | Blackwell | ................ | 43/21.2 |
| 6,123,305 A * | 9/2000 | Lukasavitz | ................ | 248/514 |
| 6,141,898 A * | 11/2000 | Shelton | ................ | 43/21.2 |
| 6,276,651 B1 * | 8/2001 | Dolan | ................ | 248/538 |
| 6,318,017 B1 * | 11/2001 | Genardo | ................ | 43/21.2 |
| 6,338,465 B1 * | 1/2002 | Stoner | ................ | 43/21.2 |
| 6,421,948 B1 * | 7/2002 | Craig | ................ | 43/21.2 |
| 6,430,864 B1 * | 8/2002 | Thomure et al. | ................ | 43/21.2 |
| 6,497,067 B1 * | 12/2002 | King | ................ | 43/21.2 |
| D478,649 S | 8/2003 | Steudeman | ................ | D22/147 |
| 6,637,146 B2 * | 10/2003 | Ernst | ................ | 43/21.2 |
| 2003/0146364 A1 * | 8/2003 | Gates et al. | ................ | 248/534 |
| 2003/0230024 A1 * | 12/2003 | Roberson | ................ | 43/21.2 |

FOREIGN PATENT DOCUMENTS

| | | | |
|---|---|---|---|
| DE | 19707904 A1 * | 9/1998 | |
| FR | 1114248 A1 * | 12/1955 | ............ 43 21.2 |
| FR | 74954 A1 * | 1/1961 | ............ 43 21.2 |
| GB | 2306092 A1 * | 4/1997 | |
| JP | 3-198735 B1 * | 8/1991 | |
| JP | 10-136855 * | 5/1998 | |
| JP | 11-146750 B1 * | 6/1999 | |
| JP | 2001-95453 B1 * | 4/2001 | |
| JP | 2002-125558 B1 * | 5/2002 | |
| JP | 2002-176895 B1 * | 6/2002 | |
| JP | 2002-238429 B1 * | 8/2002 | |
| JP | 2002-253099 B1 * | 9/2002 | |

* cited by examiner

PORTABLE FISHING POLE HOLDER

BACKGROUND OF THE INVENTION

The invention relates to a fishing pole holder. More particularly, the invention relates to a portable fishing pole holder that holds a fishing pole and is adaptable to secure to a horizontal rail, such as a boat deck rail or a pier railing, and also secure within the ground.

Fishing can require a great deal of patience, since the fisherman must often wait quite a long time for a fish to bite. Holding the fishing pole during this entire time can be tedious. Accordingly, the fisherman often seeks a way to secure the pole so that it can be left alone. Crude solutions include sticking the pole in the ground or dropping the pole into a ballasted bucket. Unfortunately, these solutions are not particularly effective and often result in the pole being pulled into the water and lost when the fish bites.

In addition, many fisherman prefer to cast several lines into the water simultaneously. Since it is not possible to manage more than one pole at a time, this requires an efficient system for holding the poles, while allowing them to be picked up quickly and easily when it is necessary to hook and reel in a fish.

U.S. Pat. No. 1,987,842 to Sampson, U.S. Pat. No. 5,009,027 to Lee, U.S. Pat. No. 6,367,815 to Liou, Des 424,658 to Mitchell, and D478,649 to Steudeman et al. all disclose various fishing rod holders that employ stakes that secure in the ground. None of these devices, however, readily adapt for use on a boat or pier.

While these units may be suitable for the particular purpose employed, or for general use, they would not be as suitable for the purposes of the present invention as disclosed hereafter.

SUMMARY OF THE INVENTION

It is an object of the invention to provide a fishing rod holder that allows a fishing pole to be set down by a fisherman. Accordingly, the fishing rod holder has a tube holster that supports the fishing pole in a secure manner.

It is another object of the invention to provide a fishing rod holder that allows the fishing pole to be effectively secured to a horizontal rail such as a boat deck rail or a pier railing. Accordingly, the rod holder has an adjustable clamp that can fasten to rails of varying diameter and shape.

It is a further object of the invention to provide a fishing rod holder that can be used to secure a fishing pole in the ground as well as to a horizontal rail. Accordingly, the fishing rod holder includes an adapter that fits within adjustable clamp and also has a pair of stakes for securing in the ground.

It is yet a further object of the invention to provide a fishing rod holder that allows the pole to be held at various angles. Accordingly, the rod holder easily pivotally adjusts and holds the adjusted position using a pair of tightening knobs.

The invention is a fishing rod holder system, for holding a fishing rod and securing to a deck rail or ground surface, using a fishing rod holder having a threaded rod, a fixed clamp attached to one end of the threaded rod, a u-shaped rod support bracket attached to the other end of the threaded rod, a movable clamp, and an adjustment wheel for holding the fixed clamp against the movable clamp. A rod support tube mounts in the u-shaped rod support bracket and has an open end for holding the fishing rod. A ground adapter has a cylindrical body that selectively inserts between the fixed clamp and movable clamp and has a pair of stakes for attaching to the ground surface. The holder may be secure to the deck rail by extending the deck rail between the fixed clamp and movable clamp and tightening the adjustment wheel thereagainst.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

DETAILED DESCRIPTION OF THE PREFERRED EMBODIMENTS

Figure 1:
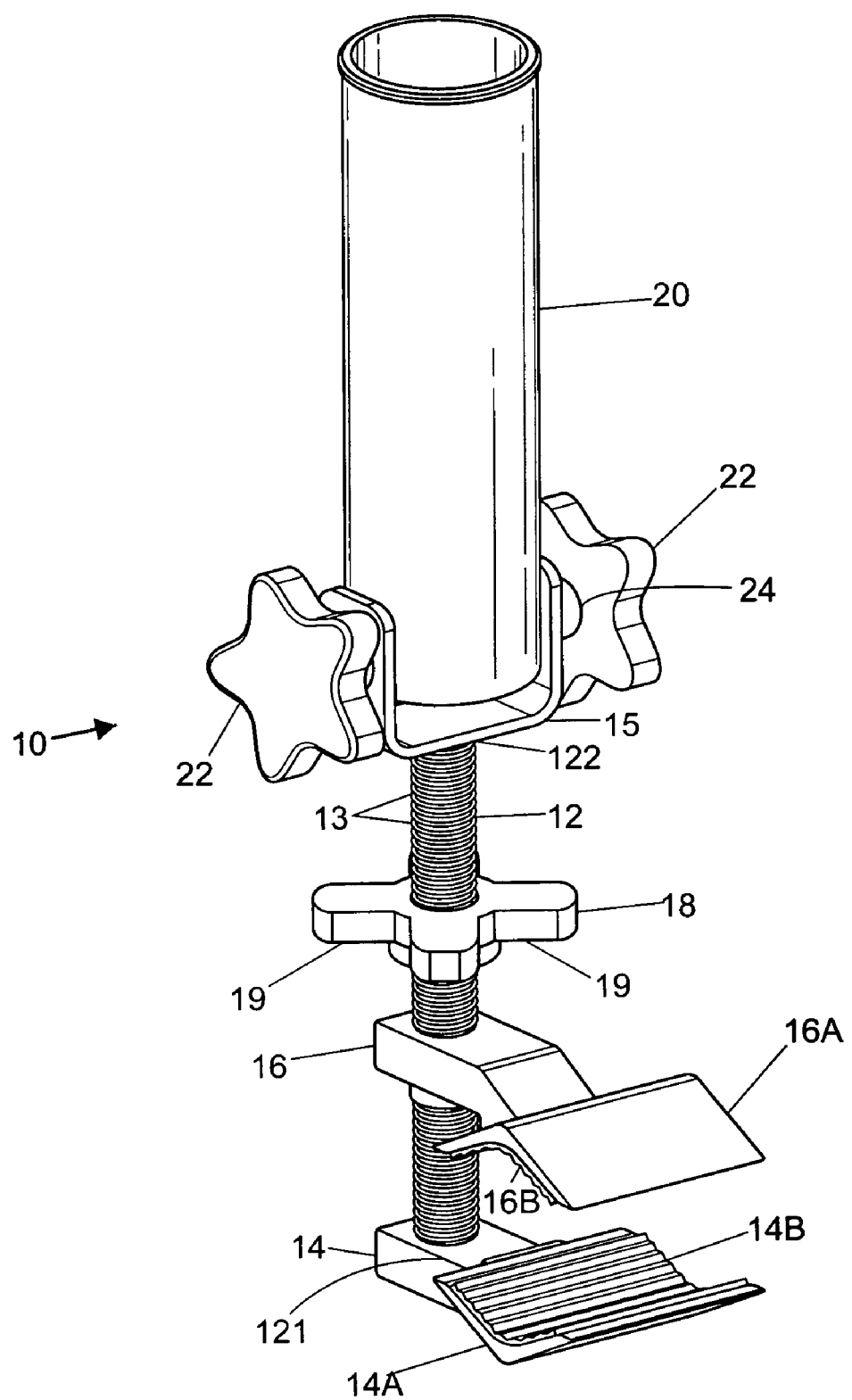
FIG. 1 is a diagrammatic perspective view, illustrating the fishing rod holder, per se.

FIG. 1 illustrates a fishing rod holder 10, having a threaded rod 12 having threads 13, a first end 121 and a second end 122. A fixed clamp support 14 is attached at the first end 121, and a u-shaped tube holder bracket 15 is attached at the second end 122.

A movable clamp support 16 is positioned on the threaded rod 12 between the first end 121 and second end 122, such that the threaded rod 12 extends through the movable clamp support 16 and the movable clamp support 16 can move toward and away from the fixed clamp support 14.

A clamp adjustment wheel 18 is also positioned on the threaded rod 12 and is located between the movable clamp support 16 and the u-shaped tube holder bracket 15. The clamp adjustment wheel 18 is operatively engaged with the threads 13 of the threaded rod 12, such that rotating the clamp adjustment wheel 18 advances the clamp adjustment wheel 18 therealong, either toward the movable clamp support 16 and fixed clamp support 14, or toward the u-shaped tube holder bracket 15. Accordingly, the clamp adjustment wheel 18 can engage the movable clamp support 16 and urge it downwardly toward the fixed clamp support 14. The clamp adjustment wheel 18 has a plurality of radial spokes 19 that facilitate easy handling and manipulation of the clamp adjustment wheel 18.

Figure 2:
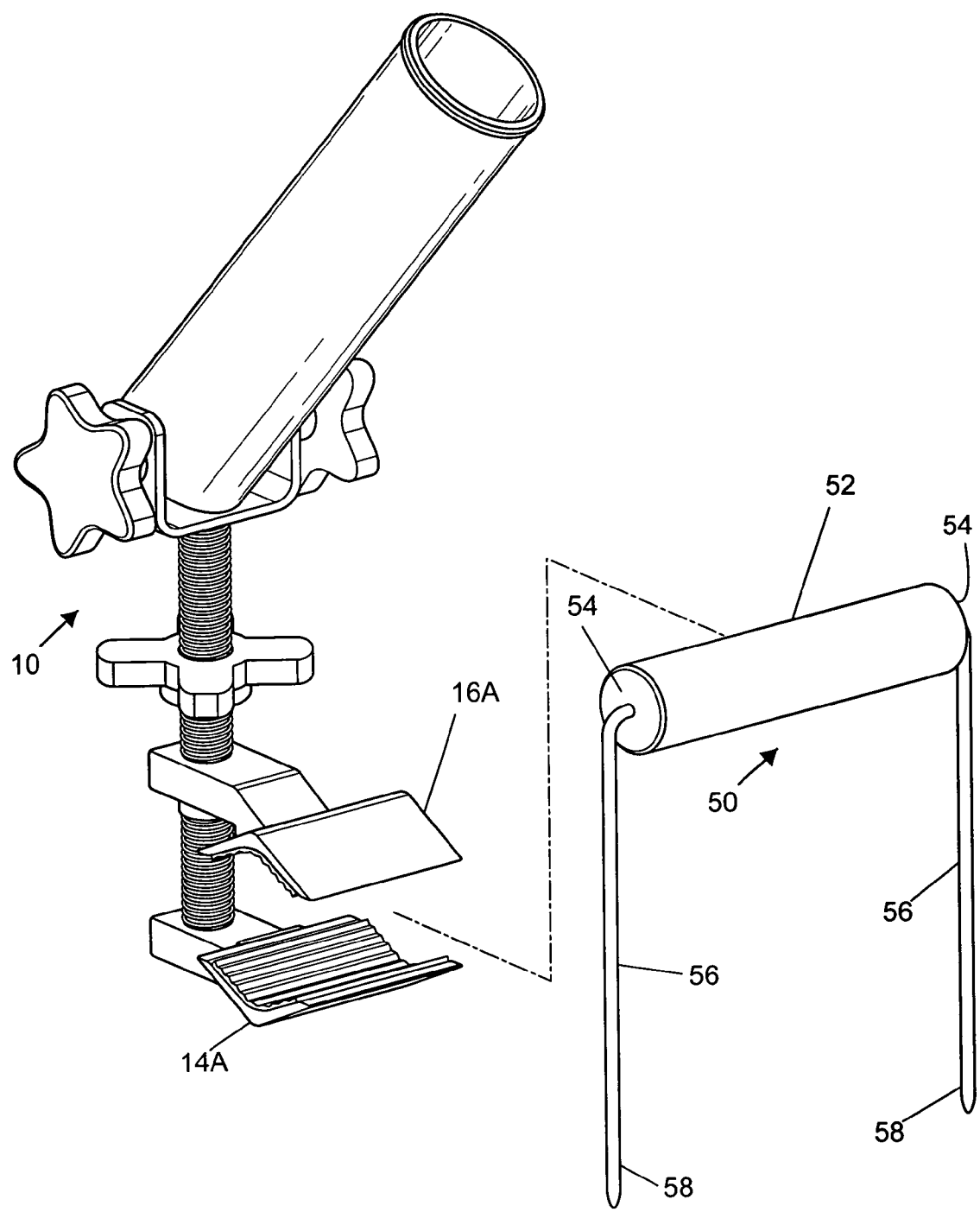
FIG. 2 is an assembly view, illustrating the ground adapter being used in conjunction with the adjustable clamp of the present invention.
Figure 3:
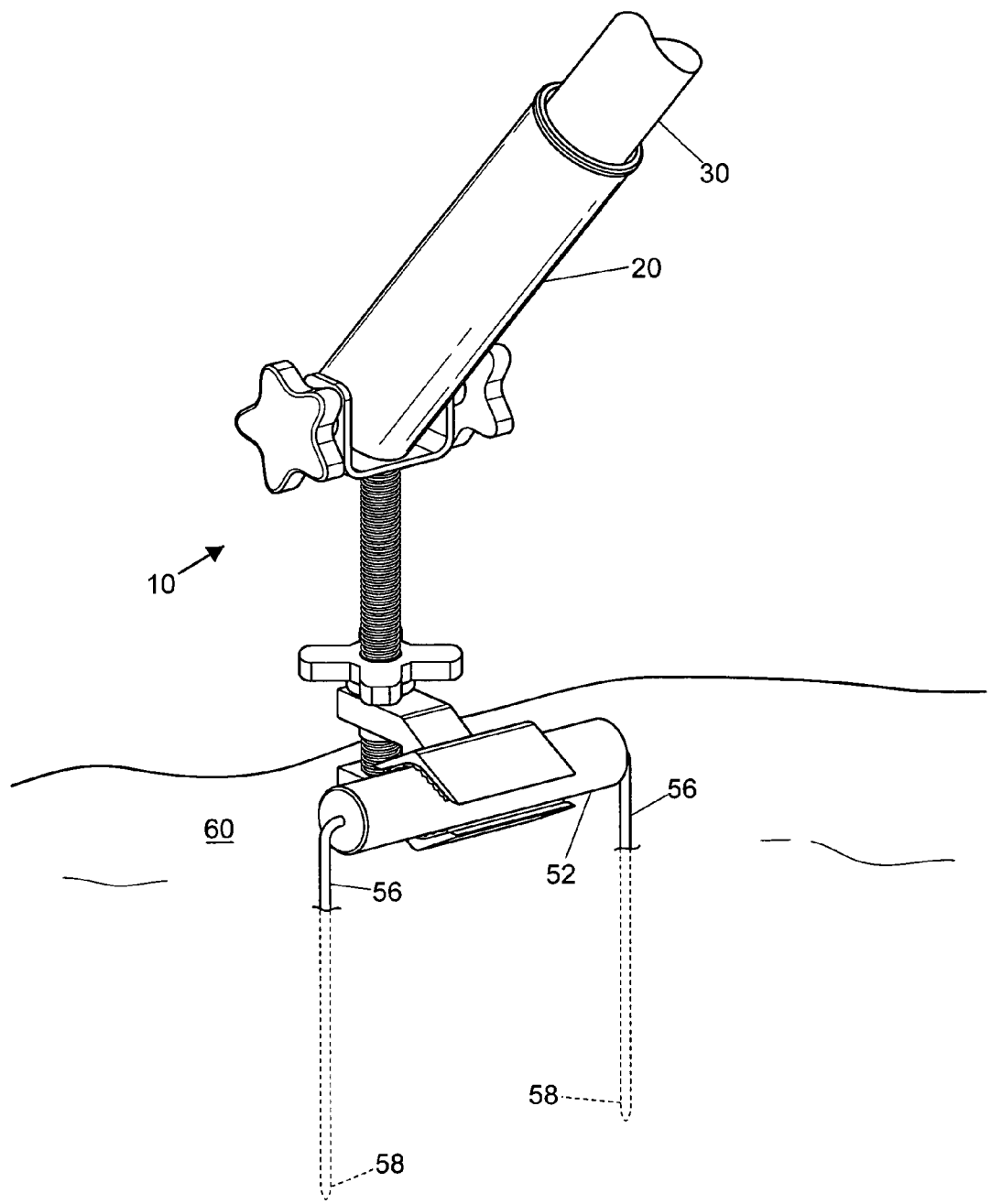
FIG. 3 is a diagrammatic perspective view, illustrating the invention in use, securing a fishing pole to a ground surface.
Figure 4:
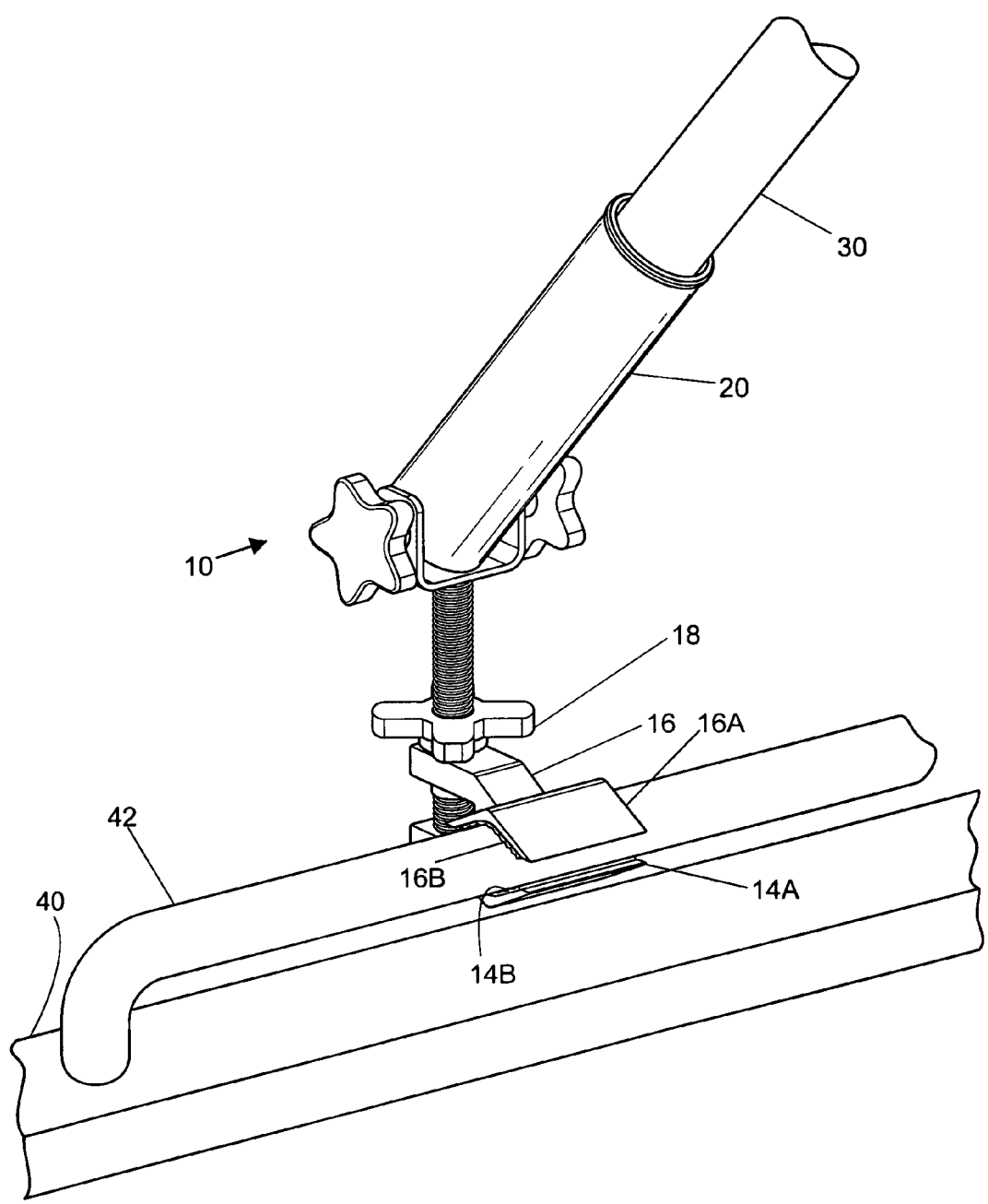
FIG. 4 is a diagrammatic perspective view, illustrating the invention in use, securing a fishing pole to a deck rail.

The fishing rod holder 10 also includes a rod support tube 20 having an open end 20A for receiving a fishing rod 30 (see FIGS. 3 and 4). The rod support tube 20 is pivotally mounted within the unshaped tube holder bracket 15 with a pair of tightening knobs 22. The tightening knobs 22 each have a tightening screw 24. The tightening screws 24 are coaxial, extend through the u-shaped tube holder bracket 15 and engage the rod support tube 20 from opposite sides, selectively allowing the rod support tube to pivot thereon as illustrated in FIGS. 2, 3, and 4, and to selectively secure the rod support tube 20 at any desired angle—the precise manner of which is well known to those skilled in the art.

The fixed clamp support 14 has a fixed clamp bracket 14A which is substantially V-shaped and has a rubber clamping surface 14B. The movable clamp support 16 has a movable clamp bracket 16A that is also substantially V-shaped and has its own rubber clamping surface 16B. The clamping surfaces 14B, 16B face each other, such that they can together engage and effectively hold a cylindrical object therebetween. The clamping surfaces 14B, 16B are also preferably ribbed to allow them to better hold an object therebetween.

Referring now to FIG. 4, the fishing rod holder 10 is being secured to a boat 40, by securing to the deck rail 42 of the boat. More particularly, the deck rail 42 extends horizontally and is engaged between the movable clamp bracket 16A and fixed clamp bracket 14A. In particular, the clamping surfaces 16B, 14B engage the deck rail 42 from above and below, and the clamp adjustment wheel 18 engages the movable clamp support 16 to hold the movable clamp bracket 16A downwardly against the deck rail 42 and thus against the fixed clamp bracket 14A. Once the fishing rod holder 10 is secured to the deck rail 42, the fishing rod 30 can be held within the rod support tube 20.

Illustrated in FIG. 2, a ground adapter 50 is also provided for use with the fishing rod holder 10. The ground adapter 50 includes a cylindrical body 52 having a pair of transverse ends 54, and a pair of stakes 56. The stakes 56 each extend from transverse ends 54, coaxially with each other and with the cylindrical body 52, and then bend downwardly such that they extend perpendicularly downwardly from the cylindrical body 52 yet parallel to each other. The stakes 56 each have a pointed end 58 fully opposite from the cylindrical body 52. The ground adapter 50 is selectively inserted between the fixed clamp bracket 14A and movable clamp bracket 16A and secured therebetween.

Referring now to FIG. 3, the fishing rod holder 10 is being secured within a ground surface 60, which may be sand, soil, or the like. Accordingly, the stakes 56 are inserted into the ground, by penetrating the ground surface 60 with the pointed ends 58 thereof, and pushing the fishing rod holder 10 downward until the cylindrical body 52 nearly reaches the ground surface 60. Now, the fishing rod 30 can be securely held within the rod support tube 20.

In conclusion, herein is presented a fishing rod holder system that allows a fishing rod to be maintained in an upright position, and selectively secures to a horizontal rail or within a ground surface. The invention is illustrated by example in the drawing figures, and throughout the written description. It should be understood that numerous variations are possible, while adhering to the inventive concept. Such variations are contemplated as being a part of the present invention.

What is claimed is:

1. A fishing rod holder, for holding a fishing rod and securing to one of a deck rail and a ground surface, comprising:
    a threaded rod having threads, a first end and a second end;
    a u-shaped tube holder bracket secured to the second end of the threaded rod;
    a rod support tube, secured within the u-shaped bracket, having an open end for receiving the fishing rod;
    a fixed clamp support secured to the first end of the threaded rod;
    a movable clamp support attached on the threaded rod between the fixed clamp support and second end;
    an adjustment wheel attached on the threaded rod, operatively engaged with the threads such that the adjustment rod advances on the threaded wheel when rotated and selectively engages the movable clamp support to urge the movable clamp support toward the fixed clamp support;
    a ground adapter, having a cylindrical body and a pair of stakes extending from the cylindrical body substantially parallel to each other, the stakes each having a pointed end fully opposite from the cylindrical body; and
    wherein the deck rail is selectively held between the movable clamp support and fixed clamp support by tightening the adjustment wheel against the movable clamp support when the fishing rod holder is secured to the deck rail, and wherein the cylindrical body is selectively held between the movable clamp support and fixed clamp support by tightening the adjustment wheel against the movable clamp support and the stakes extend into the ground surface when the fishing rod holder is secured in the ground surface.

2. The fishing rod holder as recited in claim 1, wherein the fixed clamp support has a V-shaped fixed clamp bracket and a rubber clamping surface; wherein the movable clamp support has a V-shaped movable clamp bracket and a rubber clamping surface; and wherein the rubber clamping surfaces are suited to together engage the deck rail and cylindrical body of the ground adapter.

3. The fishing rod holder as recited in claim 2, wherein the adjustment wheel has a plurality of spokes to facilitate easy rotation of the adjustment wheel.

4. The fishing rod holder as recited in claim 3, wherein the rod support tube is secured within the unshaped tube holder bracket by a pair of tightening knobs, each tightening knob having a tightening screw that extends through the u-shaped tube holder bracket and engages the rod support tube, and the tightening screws extend coaxially such that the rod support tube can pivot thereon.

5. The fishing rod holder as recited in claim 4, wherein the clamping surfaces are ribbed to allow them to better hold the cylindrical object therebetween.

6. A fishing rod holding method, for holding a fishing rod and securing to one of a deck rail and ground surface, using a holder having a threaded rod having a fixed clamp attached to one end and a u-shaped tube support bracket at an opposite end, a movable clamp on the threaded rod between the fixed clamp and u-shaped tube support bracket, and an adjustment wheel on the threaded rod between the movable clamp and u-shaped tube support bracket, a rod support tube having an open end is attached within the u-shaped tube support bracket, and a ground adapter having a cylindrical body and a pair of stakes extending therefrom, comprising the steps of:
    a) performing one of:
        securing the holder to the deck rail by extending the deck rail between the fixed clamp and movable clamp and tightening the adjustment wheel against the movable clamp, and
        securing the holder to the ground surface by
            i) inserting the cylindrical body of the ground adapter between the fixed clamp and movable clamp,
            ii) tightening the adjustment wheel against the movable clamp, and
            iii) inserting the stakes into the ground surface; and
    b) holding the fishing rod by inserting the fishing rod into the open end of the rod support tube.

* * * * *